US008302387B2

(12) United States Patent
Santhanam et al.

(10) Patent No.: US 8,302,387 B2
(45) Date of Patent: Nov. 6, 2012

(54) METHOD AND APPARATUS FOR DE-SULFURIZATION ON A DIESEL OXIDATION CATALYST

(75) Inventors: Shyam Santhanam, Aurora, IL (US); Brad Adelman, Chicago, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 519 days.

(21) Appl. No.: 12/546,717

(22) Filed: Aug. 25, 2009

(65) Prior Publication Data

US 2011/0047968 A1    Mar. 3, 2011

(51) Int. Cl.
*F01N 3/00* (2006.01)
*F01N 1/00* (2006.01)

(52) U.S. Cl. ............ 60/295; 60/286; 60/288; 60/324

(58) Field of Classification Search ............ 60/273–324
See application file for complete search history.

(56) References Cited

U.S. PATENT DOCUMENTS

| | | | |
|---|---|---|---|
| 5,974,790 A * | 11/1999 | Adamczyk et al. | 60/274 |
| 5,974,791 A * | 11/1999 | Hirota et al. | 60/276 |
| 6,708,486 B2 * | 3/2004 | Hirota et al. | 60/297 |
| 6,813,882 B2 * | 11/2004 | Hepburn et al. | 60/286 |
| 6,823,664 B2 * | 11/2004 | Nakatani et al. | 60/295 |
| 7,047,730 B2 | 5/2006 | Wang | |
| 7,299,626 B2 | 11/2007 | Barasa | |
| 7,308,788 B1 | 12/2007 | Das | |
| 7,353,648 B2 | 4/2008 | Zhang | |
| 7,433,776 B1 | 10/2008 | Hunter | |
| 7,484,503 B2 | 2/2009 | Wyatt | |
| 7,533,519 B2 | 5/2009 | McNulty | |
| 2005/0153828 A1 * | 7/2005 | Uekusa et al. | 502/60 |
| 2005/0247049 A1 * | 11/2005 | Kaboord et al. | 60/286 |
| 2006/0086085 A1 | 4/2006 | Wang | |
| 2006/0123773 A1 | 6/2006 | Zhang | |
| 2006/0260296 A1 * | 11/2006 | Theis | 60/286 |
| 2006/0266019 A1 | 11/2006 | Ricart-Ugaz | |
| 2007/0044455 A1 | 3/2007 | Barasa | |
| 2007/0101699 A1 | 5/2007 | McNulty | |
| 2007/0193258 A1 | 8/2007 | Berke | |
| 2007/0234711 A1 | 10/2007 | Berke | |
| 2007/0271906 A1 | 11/2007 | Berke | |
| 2007/0294999 A1 * | 12/2007 | Yoshizaki et al. | 60/274 |
| 2008/0028750 A1 | 2/2008 | Zukouski | |
| 2008/0104946 A1 * | 5/2008 | Wang et al. | 60/295 |
| 2008/0154478 A1 | 6/2008 | Lyons | |

(Continued)

*Primary Examiner* — Kenneth Bomberg
*Assistant Examiner* — Anthony Ayala Delgado
(74) *Attorney, Agent, or Firm* — Mark C. Bach; Jeffrey P. Calfa

(57) ABSTRACT

A diesel exhaust after-treatment system (110, 210) for a vehicle includes a precious metal primary diesel oxidation catalyst (DOC1) and a precious metal secondary diesel oxidation catalyst (DOC2). The primary diesel oxidation catalyst (DOC1) is located on an exhaust pipe (116, 250) and in fluid communication with and between an engine (12) and an exhaust gas outlet (126, 226). The secondary diesel oxidation catalyst (DOC2) is disposed in fluid communication with the primary diesel oxidation catalyst (DOC1) on a second exhaust pipe (130, 230, 232) and in fluid communication with the engine (12). At least one valve (128, 228, 246) is disposed on the exhaust pipe (116, 216) for selectively permitting the continuous, positive flow of exhaust gas through the secondary diesel oxidation catalyst (DOC2). When the primary diesel oxidation catalyst (DOC1) has a pre-determined amount of sulfur saturation, the valve (128, 228, 246) is switched to permit the continuous, positive flow of exhaust gas through the secondary diesel oxidation catalyst (DOC2).

3 Claims, 4 Drawing Sheets

U.S. PATENT DOCUMENTS

2008/0184696 A1 8/2008 Wyatt
2008/0256928 A1 10/2008 Hunter
2008/0314371 A1 12/2008 Wyatt
2009/0000275 A1 1/2009 Zielke

* cited by examiner

METHOD AND APPARATUS FOR DE-SULFURIZATION ON A DIESEL OXIDATION CATALYST

BACKGROUND

Embodiments described herein relate to diesel engine exhaust systems. More particularly, embodiments described herein relate to precious metal based diesel oxidation catalysts for use in exhaust after-treatment systems of diesel engines that do not burn ultra low sulfur diesel (ULSD) fuel.

Sulfur occurs naturally in crude oil and sulfur removal is an increasingly important part of the diesel refining process. The petroleum industry is producing Ultra Low Sulfur Diesel (ULSD) fuel, a cleaner-burning diesel fuel containing a maximum of fifteen parts-per-million (ppm) sulfur. Many countries, including the United States, mandate the use of ULSD fuel. However, some countries do not require the use of ULSD fuel. In markets where ULSD fuel is not mandated, the sulfur content of diesel fuel can be hundreds or thousands of parts-per-million.

Precious metal catalysts are used to reduce emissions of harmful gasses from diesel engine exhaust. Environmental and human health concerns are the impetus for a major reduction in the sulfur content of diesel fuels and emission levels from diesel engines. In markets outside of North America, where ULSD fuel is not mandated, it is cumbersome and impractical to use precious metals in the exhaust after-treatment systems because sulfur deposits form on the active sites of the catalyst in the form of a sulfate or other sulfur-metal compound, which renders the catalyst ineffective, known as "sulfur poisoning". Poisoning of the catalyst requires frequent servicing of the exhaust after-treatment to burn off the sulfur. For this reason, most diesel engine manufacturers in the non-low sulfur markets refrain from configuring the exhaust after-treatment systems with precious metal based diesel oxidation catalysts.

SUMMARY OF THE INVENTION

A diesel exhaust after-treatment system for a vehicle includes a precious metal primary diesel oxidation catalyst and a precious metal secondary diesel oxidation catalyst. The primary diesel oxidation catalyst is located on an exhaust pipe and in fluid communication with and between an engine and an exhaust gas outlet. The secondary diesel oxidation catalyst is disposed in fluid communication with the primary diesel oxidation catalyst on a second exhaust pipe and in fluid communication with the engine. At least one valve is disposed on the exhaust pipe for selectively permitting the continuous, positive flow of exhaust gas through the secondary diesel oxidation catalyst. When the primary diesel oxidation catalyst has a pre-determined amount of sulfur saturation, the valve is switched to permit the continuous, positive flow of exhaust gas to through the secondary diesel oxidation catalyst.

DETAILED DESCRIPTION

Figure 1:
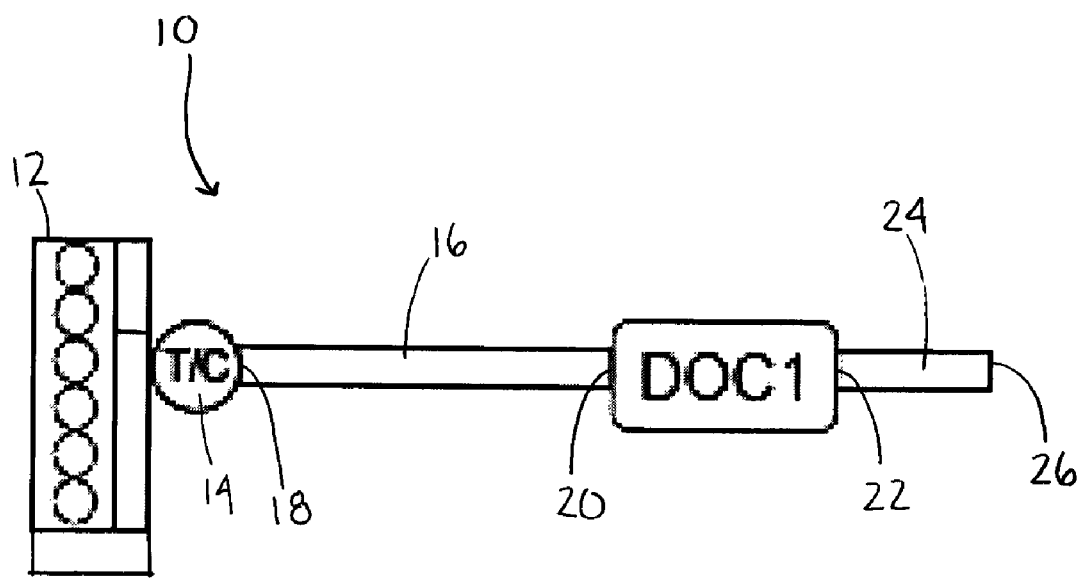
FIG. 1 is a schematic of a diesel exhaust after-treatment system where diesel engine exhaust gas flows from a turbocharger to a diesel oxidation catalyst (DOC1).

Referring to FIG. 1, a conventional diesel exhaust after-treatment system for use on a vehicle (not shown), is indicated generally at 10. A diesel engine 12 produces exhaust gas containing hydrocarbons, carbon monoxide, particulate matter and other chemical compounds. Sulfur occurs naturally in crude oil and is a key component of the particulate matter in diesel engine exhaust gas.

From the engine 12, exhaust gas flows through a turbocharger 14. A first exhaust pipe 16 carries the exhaust gas from an outlet 18 of the turbocharger 14 to an inlet 20 of a precious metal based diesel oxidation catalyst DOC1. The exhaust gas flows from the diesel oxidation catalyst DOC1 at a catalyst outlet 22 and flows through an outlet exhaust pipe 24 where it exits the after-treatment system 10 at an outlet 26. Additionally, though not shown in FIG. 1, there may be other components on the after-treatment system 10, for example a diesel particulate filter downstream from the diesel oxidation catalyst DOC1.

Figure 2:
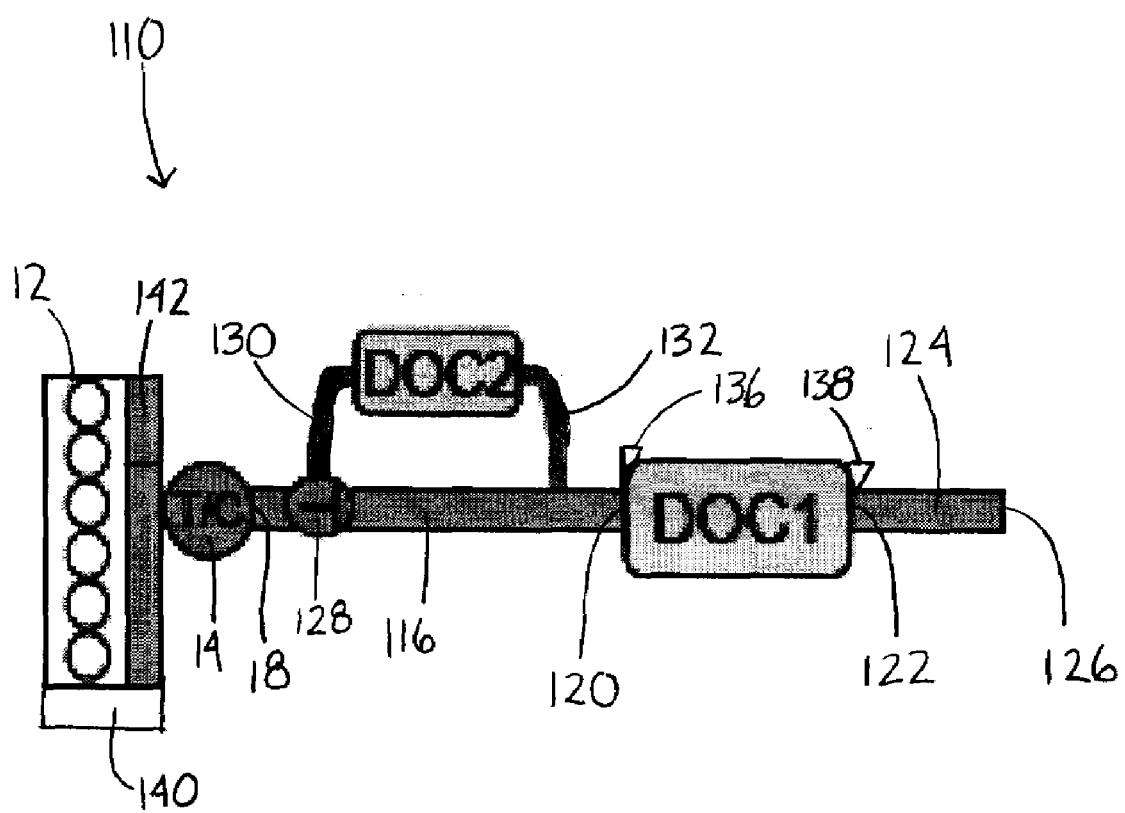
FIG. 2 is a schematic showing a diesel exhaust after-treatment system that utilizes a secondary diesel oxidation catalyst (DOC2) to which exhaust gas is diverted when the primary diesel oxidation catalyst (DOC1) is deactivated by sulfur.

Referring now to FIG. 2, a first embodiment of the after-treatment system 110 has a secondary precious metal based diesel oxidation catalyst ("secondary catalyst") DOC2 in fluid communication with a primary precious metal based diesel oxidation catalyst ("primary catalyst") DOC1. The shared components of the after-treatment system 10 are denoted with corresponding numbers in the 100-series. When the primary catalyst DOC1 becomes deactivated due to a build-up of sulfur deposits, the secondary catalyst DOC2 is used to generate an exotherm to regenerate or burn-off the sulfur deposits on the primary catalyst DOC1.

The secondary catalyst DOC2 is located downstream of the turbocharger 14 and upstream of the primary catalyst DOC1. In FIG. 2, a three way valve 128 is located at a junction of a first exhaust pipe 116 and a catalyst inlet pipe 130. The three-way valve 128 selectively permits the flow of exhaust gas to the catalyst inlet pipe 130 from the turbocharger 14. Exhaust gas flows from the catalyst inlet pipe 130 to the secondary catalyst DOC2. A catalyst outlet pipe 132 is downstream of the secondary catalyst DOC2 and permits the flow of exhaust gas from the secondary catalyst DOC2 back to the first exhaust pipe 116 and to an inlet 120 of a primary catalyst DOC1. Alternatively, the outlet pipe 132 may be in direct fluid communication with the DOC1. Although not shown, a three way valve may also be placed at the junction of the catalyst outlet pipe 132 and the first exhaust pipe 116. However, a valve is not necessary because back pressure would force the exhaust to flow in the proper direction toward the inlet 120 of the primary catalyst DOC1.

A temperature sensor 136, such as a thermocouple, is placed at the inlet 120 of the primary catalyst DOC1. The temperature sensor 136 measures the temperature of the exhaust gas and communicates the exhaust gas temperature to an engine control unit 140. A second temperature sensor 138 is located at an outlet 122 of the primary DOC1 to communicate the temperature of the exhaust gases exiting the primary DOC1 to the engine control unit 140. The exhaust gas flows from the DOC1 to an outlet exhaust pipe 124 and an outlet 126 of the after treatment system 110.

The secondary catalyst DOC2 is not exposed to exhaust gas from an outlet 18 of a turbocharger 14 until the three-way valve 128 is actuated. The valve 128 is controlled by a predictive method which is based on a performance model of the engine exhaust after-treatment system 110. The signaling event for the valve 128 to switch occurs when the engine control module 140 determines that the primary catalyst DOC1 has a pre-determined amount of saturation or deactivation due to sulfur deposits. The amount of deactivation of the primary catalyst DOC1 is determined by a relationship between the temperature of the exhaust gas at the inlet 120 and the outlet 122 of the primary catalyst DOC1, although other factors can be used to determine the level of saturation. When the engine control unit 140 switches the valve 128, the valve routes the exhaust gas flow, in full or in part, from the turbocharger outlet 18 to the secondary catalyst DOC2.

Sulfur deposits located on the saturated primary DOC1 are removed by thermal exposure. The heat is created at the secondary catalyst DOC2 by a process that starts with a fuel injection by the injector means 142. In one embodiment, the injector means is the engine's fuel injector 142, however any other method or apparatus for introducing the fuel into the after-treatment system is contemplated. The added fuel is a reducing agent which oxidizes in the secondary catalyst DOC2 and generates an exotherm, which is a chemical compound that gives off heat during its formation and absorbs heat during its decomposition. The heat generated by oxidation of fuel in the secondary catalyst DOC2 is transferred from the DOC2 to the exhaust gas that flows out of the DOC2. With the flow of exhaust gas, the heat is transferred to the primary catalyst DOC1 and is sufficient to burn off the sulfur and thereby regenerate the primary catalyst DOC1. After regeneration, the primary catalyst DOC1 is ready to be used and the valve 128 is returned to its initial condition where secondary catalyst DOC2 is not in fluid communication with the engine 12.

The fuel injection to the secondary catalyst DOC2 is controlled by the fuel injector 142 located in the engine 12. Alternatively, the fuel may be dosed by an injector 142 directly into the after-treatment system 110 after the turbocharger 14 but upstream of the secondary DOC2, or at the inlet of the DOC2.

In one embodiment, the secondary catalyst DOC2 will not become saturated with sulfur during the vehicle life. In another embodiment, the secondary catalyst DOC2 may become saturated during the vehicle life, and if the secondary catalyst DOC2 becomes saturated with sulfur, the secondary catalyst DOC2 can be replaced or regenerated.

Figure 3:
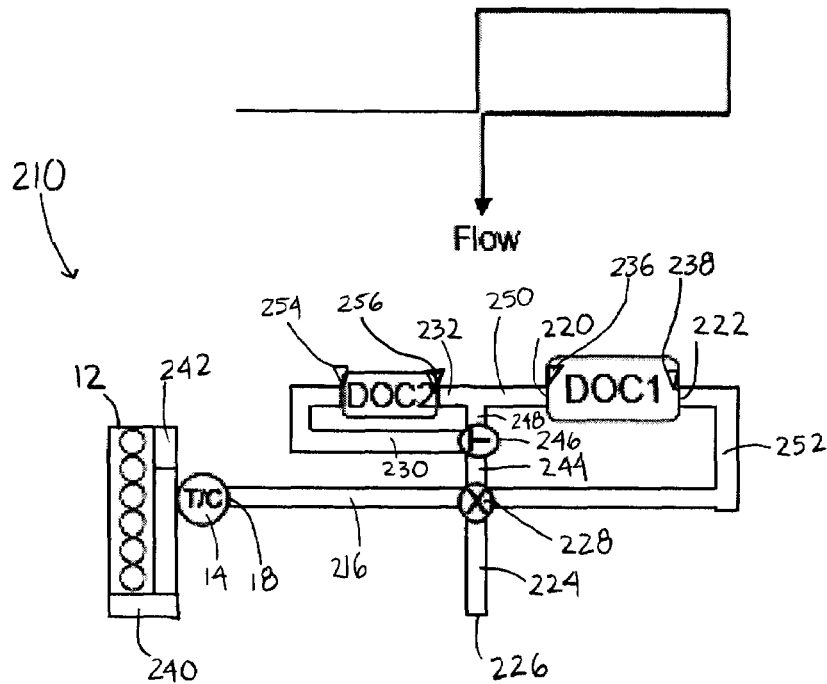
FIG. 3 is a schematic of a second embodiment of an exhaust after-treatment system having a primary diesel oxidation catalyst (DOC1) and a secondary diesel oxidation catalyst (DOC2) indicating the direction of exhaust gas flow when the main diesel oxidation catalyst (DOC1) is operational and not deactivated by sulfur.
Figure 4:
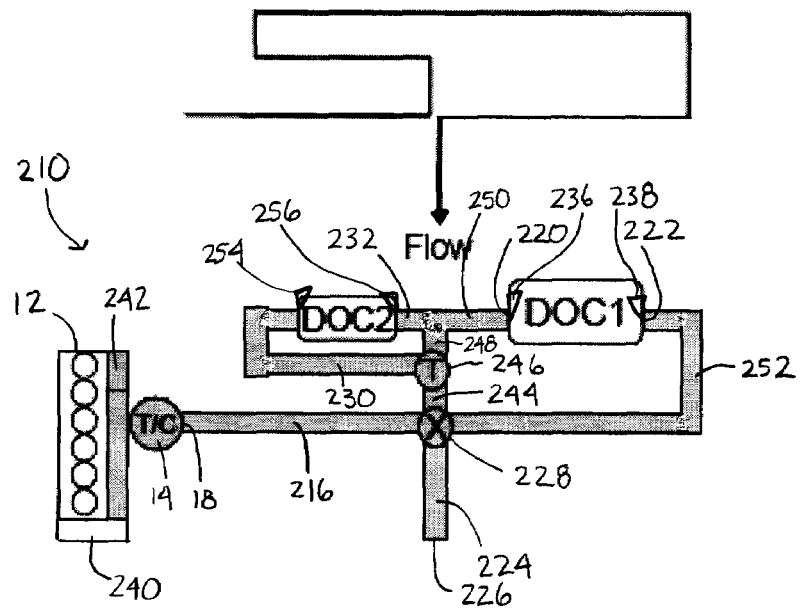
FIG. 4 is a schematic of the second embodiment of the exhaust after-treatment system indicating the exhaust flow through the secondary diesel oxidation catalyst (DOC2) upstream of the primary diesel oxidation catalyst (DOC1) when the primary diesel oxidation catalyst (DOC1) is deactivated by sulfur.
Figure 5:
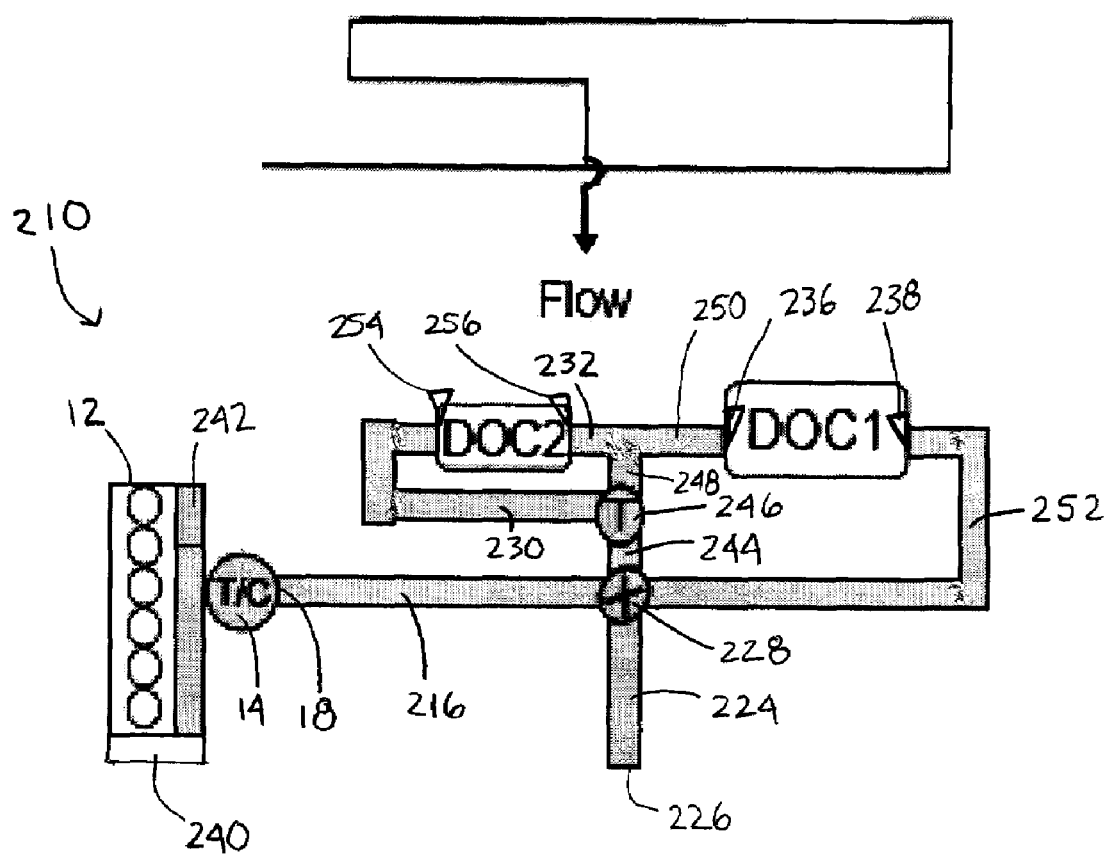
FIG. 5 is a schematic of the second embodiment of the exhaust after-treatment system indicating the exhaust gas flow through the primary diesel oxidation catalyst (DOC1) upstream of the secondary diesel oxidation catalyst (DOC2) when the secondary diesel oxidation catalyst (DOC2) is deactivated by sulfur.

Referring now to FIG. 3 to FIG. 5, a second embodiment of the exhaust after-treatment system 210 is shown. The shared components of the after-treatment system 10 and 110 are denoted with corresponding numbers in the 200-series. The after-treatment system 210 provides for the regeneration of a primary precious metal based catalyst DOC1 as well as the regeneration of a secondary precious metal based catalyst DOC2, where the secondary catalyst DOC2 may become partially deactivated after repeated exposure to high sulfur fuel during the regeneration of the primary DOC1.

Referring now to FIG. 3, the flow of exhaust gas is indicated in the normal state, where neither the primary catalyst DOC1 nor the secondary catalyst DOC2 are saturated with sulfur and neither require regeneration. Under this normal operating mode, the secondary catalyst DOC2 is not used to create an exotherm.

Exhaust gas flows from the engine 12 to the turbocharger 14, and out of the turbocharger outlet 18. A first exhaust pipe 216 carries the exhaust gas to a four-way valve 228 that routes the exhaust gas through a second exhaust pipe 244 to a three-way valve 246. In this mode of operation, the three-way valve 246 directs the exhaust gas flow through a third exhaust pipe 248 to a fourth exhaust pipe 250 that is in fluid communication with an inlet 220 of the primary catalyst DOC1. When the exhaust gas exits the outlet 222 of the primary catalyst DOC1, the exhaust gas flows through a fifth exhaust pipe 252 back to the four-way valve 228. The four-way valve 228 permits the exhaust gas to flow to an outlet exhaust pipe 224 and out of the outlet 226. In one embodiment, another valve can be located at the junction of the third exhaust pipe 248 and the fourth exhaust pipe 250 to prevent the flow of exhaust gases to the secondary catalyst DOC2, or alternatively, the three-way valve 246 would create a back-pressure that would prevent the continuous, positive flow of exhaust gas through the secondary catalyst DOC2. In this configuration and in the normal state of operation, the secondary catalyst DOC2 is not generating an exotherm.

Referring now to FIG. 4, the flow of exhaust gas through the after-treatment system is indicated when the primary catalyst DOC1 is saturated and the secondary catalyst DOC2 is used to regenerate the primary catalyst DOC1. The first regeneration state of operation occurs when the engine control unit 240 receives temperature information from an inlet temperature sensor 236 and an outlet temperature sensor 238 located at the primary catalyst DOC1 indicating that there is sulfur saturation at the primary catalyst DOC1. In response to this information, the valve 246 switches to permit the flow of exhaust gases as described below.

The exhaust gas flows from the engine 12 to the turbocharger 14 and out the turbocharger outlet 18. From the turbocharger outlet 18, the exhaust gas flows to the four way valve 228, which permits the exhaust gas to flow from the first exhaust pipe 216 to the second exhaust pipe 244. In this mode of operation, the three-way valve 246 is switched to permit the exhaust gas to flow from the second exhaust pipe 244 to a catalyst inlet pipe 230 of the secondary catalyst DOC2. As with the first embodiment of the exhaust after-treatment system 110 in FIG. 2, the engine control unit 240 uses the temperature data from the temperature sensors 236, 238 to determine when sulfur saturation occurs and when the three-way valve 246 is switched to direct the exhaust gas flow as described above. When the exhaust gas flows through the secondary catalyst DOC2, fuel reductant is introduced into the secondary catalyst DOC2 to be oxidized. As a result of the chemical reaction that takes place as the fuel is oxidized in the secondary catalyst DOC2, the exhaust gas that leaves the secondary catalyst DOC2 is sufficiently hot to regenerate the primary catalyst DOC1 as the exhaust gas flows through it.

Upon exiting the secondary catalyst DOC2, the heated exhaust gas flows through a fourth exhaust pipe 250 to an inlet 220 of the primary catalyst DOC1. The heated exhaust gas flows through the primary catalyst DOC1 and regenerates the DOC1. From the primary catalyst DOC1, the exhaust gas flows out of an outlet 222, and through a fifth exhaust pipe 252 to the four-way valve 228. The four-way valve 228 directs the exhaust gas flow from the fifth exhaust pipe 252 to an outlet exhaust pipe 224 and to the outlet 226 of the after-treatment system 210.

When the engine control unit 240 determines that the sulfur on the primary catalyst DOC1 has been removed, valve 228 and 248 are switched to positions that permit exhaust to flow as previously described with respect to FIG. 3. This cycle continues unless and until the secondary catalyst DOC2 becomes deactivated by sulfur saturation.

Referring now to FIG. 5, the state of operation where the secondary catalyst DOC2 is saturated with sulfur is shown. The engine control unit 240 determines that the secondary catalyst DOC2 is saturated with sulfur by receiving temperature data from the temperature sensors 236, 238 of primary catalyst DOC1, or alternatively, with temperature sensors 254, 256 associated with the secondary catalyst DOC2. Temperature data from temperature sensors 236, 238 can be used by the engine control unit 240 to determine when the secondary catalyst DOC2 is saturated with sulfur. The engine control unit 240 switches the valves 228 and 246 to direct the flow of exhaust gas as will be described below.

The exhaust gas flows from the engine 12 to the turbocharger 14 and out the turbocharger outlet 18. From the turbocharger outlet 18, the exhaust gas flows to the four way valve 228, which permits the exhaust gas to flow from the first exhaust pipe 216 to the fifth exhaust pipe 252. The four-way valve 228 permits the exhaust gas to flow through the fifth exhaust pipe 252 to the primary catalyst DOC1. Oxidation of the fuel reductant takes place in the primary catalyst DOC1, whether from a late injection controlled by the fuel injector 242 or a dosing directly into the exhaust line downstream of the turbocharger 18. An exotherm is formed at the primary catalyst DOC1, thus providing sufficient heat to regenerate the secondary catalyst DOC2.

From the primary catalyst DOC1, the exhaust gas flows through the fourth exhaust pipe 250 to the catalyst pipe 232 to the secondary catalyst DOC2. Out of the secondary catalyst DOC2, the exhaust gas flows through the catalyst pipe 230 and to the three-way valve 246. The three-way valve 246 permits the exhaust gas to flow through the second pipe 244 to the four-way valve 228 where the exhaust gas is finally directed to the outlet exhaust pipe 224 that carries the exhaust to the outlet 226 of the after-treatment system 210.

When the engine control unit 240 determines that the secondary catalyst DOC2 is regenerated, the valves 228 and 246 are switched to the positions as described with respect to FIG. 3. With these three modes of operation, both the primary catalyst DOC1 and the secondary catalyst DOC2 can be regenerated, and precious metals can be used in the catalysts. In one embodiment, additional diesel oxidation catalysts can be incorporated. Further, other types of pipes and valves can be incorporated.

What is claimed is:

1. A diesel exhaust after-treatment system for a vehicle comprising:

a precious metal primary diesel oxidation catalyst located on an exhaust pipe and in fluid communication with and between an engine and an exhaust gas outlet;

a precious metal secondary diesel oxidation catalyst selectively in fluid communication with the primary diesel oxidation catalyst;

a fuel injector for injecting fuel into the exhaust gas and being oxidized at one of the primary diesel oxidation catalyst; and the secondary diesel oxidation catalyst for heating the exhaust gas that flows to the other of the primary diesel oxidation catalyst and the secondary diesel oxidation catalyst; and an electronic control unit including programming configured to execute at least three modes of operation, the at least three modes of operation comprising:

a normal operating mode wherein the exhaust gas flows from the engine to the primary diesel oxidation catalyst to the outlet, and wherein the secondary diesel oxidation catalyst does not receive continuous, positive exhaust gas flow through the secondary diesel oxidation catalyst;

a second operating mode wherein the primary diesel oxidation catalyst is saturated with sulfur, and the exhaust gas flows from the engine to the secondary diesel oxidation catalyst to the primary diesel oxidation catalyst to the outlet; and a third operating mode wherein the secondary diesel oxidation catalyst is saturated with sulfur, and the exhaust gas flows from the engine to the primary diesel oxidation catalyst to the secondary diesel oxidation catalyst to the outlet.

2. The diesel after-treatment system of claim 1 further comprising at least one valve disposed on the exhaust pipe for selectively permitting the flow of exhaust gas to the secondary diesel oxidation catalyst, wherein when the primary diesel oxidation catalyst has a pre-determined amount of sulfur saturation, the valve is switched to permit the exhaust gas to flow to the secondary diesel oxidation catalyst.

3. The diesel after-treatment system of claim 1 further comprising:

a first exhaust pipe located between the engine and a four-way valve;

a second exhaust pipe located between the four-way valve and a three-way valve;

a first catalyst pipe extending between the three-way valve and the secondary diesel oxidation catalyst;

a third pipe extending from the three-way valve;

a fourth pipe in fluid communication with the third pipe and the primary diesel oxidation catalyst;

a second catalyst pipe in fluid communication with the secondary diesel oxidation catalyst and the fourth pipe; and a fifth pipe in fluid communication with the secondary diesel oxidation catalyst and the four-way valve.

* * * * *